United States Patent

[11] 3,615,360

[72] Inventors Harry Gordon Harris, Jr.
Metairie;
Raymond V. Bailey, New Orleans; Charles Toth, Westwego, all of La.
[21] Appl. No. 863,924
[22] Filed Oct. 6, 1969
[45] Patented Oct. 26, 1971
[73] Assignee Applied Aluminum Research Corporation
Westwego, La.

[54] PROCESS FOR THE CONTINUOUS PRODUCTION OF ALUMINUM
7 Claims, 1 Drawing Fig.

[52] U.S. Cl................................................. 75/68 R,
75/68 A, 75/68 B, 23/87, 23/93
[51] Int. Cl....................................................C22b 21/02,
C01f 7/60, C01g 45/06
[50] Field of Search......................................... 75/63, 68
R, 68 A, 68 B; 23/87, 93

[56]     References Cited
UNITED STATES PATENTS
2,452,665  11/1948  Kroll et al..................... 75/63
3,078,159   2/1963  Hollingshead et al. ....... 75/68 B X
3,137,567   6/1964  McGeer......................... 75/68 B X Primary Examiner—Henry W. Tarring, II
Attorney—Lane, Aitken, Dunner & Ziems ABSTRACT: Process for the continuous production of aluminum from the reaction of aluminum trichloride and manganese. Four principal zones connected to permit the necessary reactant flows are provided within a single column of a reactor furnace, an upper chlorination zone for forming aluminum trichloride, a manganese oxide reduction zone for forming manganese, an aluminum trichloride reduction zone for forming aluminum from aluminum trichloride and manganese and a lower rectification zone for continuous withdrawal of high-purity aluminum.

PATENTED OCT 26 1971
3,615,360
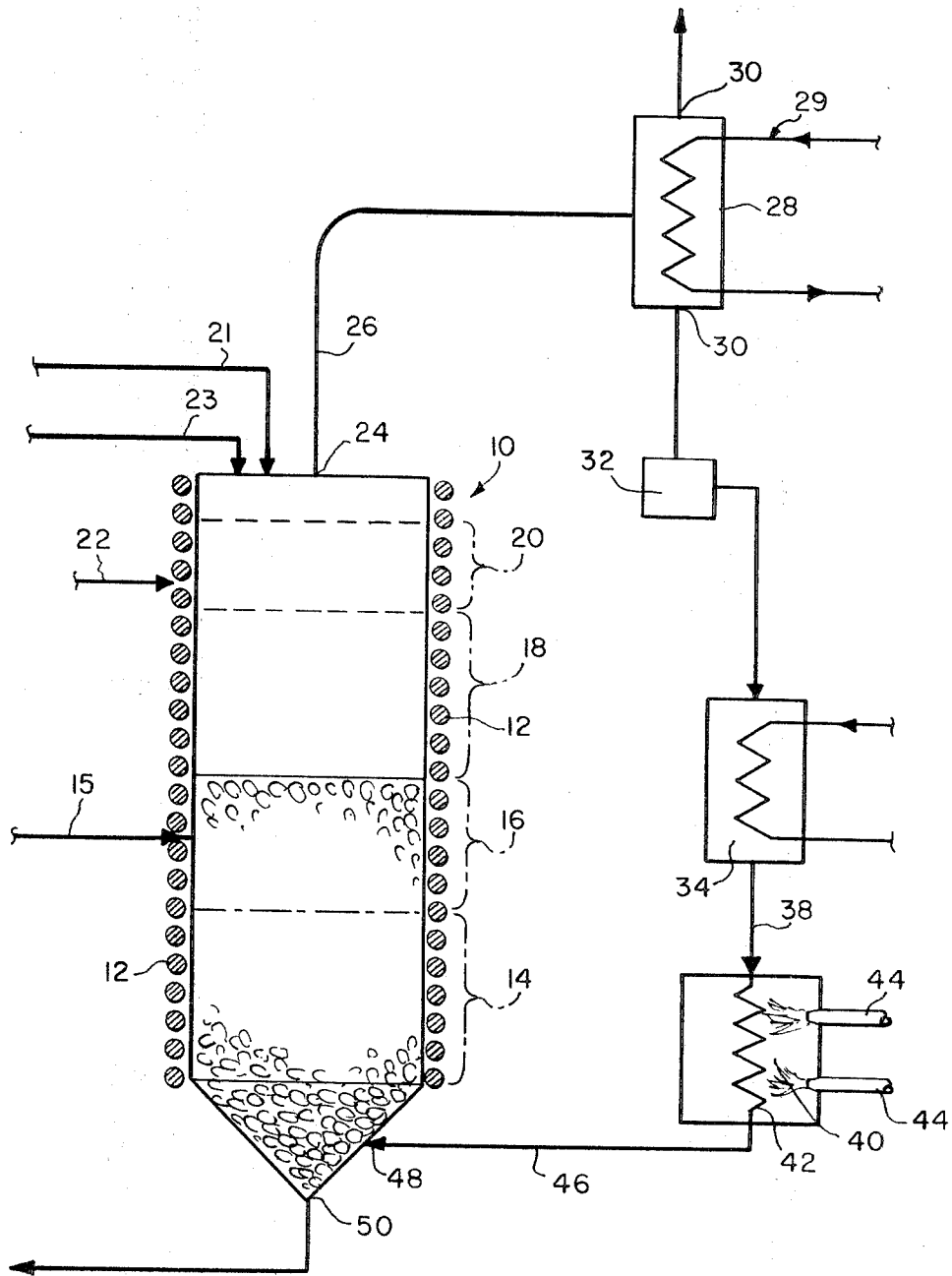
INVENTOR
HARRY GORDON HARRIS, JR
RAYMOND V. BAILEY &
CHARLES TOTH
BY Lane, Aitken, Dunner & Ziems
ATTORNEYS

PROCESS FOR THE CONTINUOUS PRODUCTION OF ALUMINUM

BACKGROUND OF THE INVENTION

In patent application Ser. No. 629,036, filed Dec. 20, 1967, the teachings of which are incorporated herein by reference, a process is disclosed which involves the reaction of aluminum trichloride with manganese to yield aluminum and manganese chloride. The invention disclosed in application Ser. No. 692,036 is one of the most significant advances in aluminum refining since the discovery of the Bayer-Hall process and provides for the first time in the history of the aluminum industry a commercially practicable approach to the production of high-quality aluminum by nonelectrolytic means. More specifically, that invention broadly involves a cyclic process employing a two-step sequence, the first step involving the reaction of alumina under reducing conditions in the presence of carbon with manganese chloride to form aluminum trichloride and manganese and the second step involving the reaction of aluminum trichloride and manganese at a temperature sufficient to reduce the aluminum trichloride to aluminum following which the manganese chloride produced in the latter step is recycled to the first step.

In the preferred embodiment of the process disclosed in application Ser. No. 692,036, an aluminum-manganese alloy containing a high percentage of aluminum is produced in batches within a reactor or series of reactors. In that process aluminum trichloride is bubbled into a manganese-containing reactor until a main reaction between the aluminum trichloride and manganese no longer occurs. The process is then halted within that reactor and the resulting high-percentage aluminum alloy portion of the reaction product is withdrawn. The manganese chloride portion of the reaction product is delivered to a furnace where it is reduced to manganese to be added later to a reactor.

During the main reaction, manganese is consumed while aluminum is produced in the reaction chamber of the reactor. The reaction is continued until the reaction chamber contains a large amount of aluminum and a correspondingly small amount of manganese. Thus, the final product that is produced by the method disclosed in application Ser. No. 692,036 is an aluminum-manganese alloy with a high aluminum/manganese ratio.

In many applications, the final product resulting from the method of application Ser. No. 692,036 is satisfactory since it is well known in the art that manganese imparts desirable properties to aluminum. Thus, approximately 75 percent of all the aluminum sold contains 0.1 to 2 percent by weight of manganese. In fact, it is common practice in the aluminum art to add manganese to otherwise manganese-free aluminum to produce a "master alloy." Manganese is especially desirable in an aluminum alloy to be used in extrusion products which is only one of many uses for "master alloys." In certain applications, however, it is desirable to have available essentially pure aluminum.

Additionally, it is desirable to be able to produce essentially pure aluminum on a continuous production basis. It is also desirable to eliminate separate furnaces and reactors which are employed to handle the manganese chloride and manganese components of the process described above.

SUMMARY OF THE INVENTION

The problems encountered in the foregoing process are significantly reduced in accordance with the present invention by utilizing manganese and manganese chloride as intermediates in a single furnace-reactor. In such a process the manganese chloride and manganese never leave the furnace-reactor. This permits continuous operation and eliminates the need for equipment to handle these components separately. This process is also capable of producing an essentially manganese-free final product.

It is accordingly a principal object of the present invention to provide a process for the continuous production of aluminum from the reduction al. aluminum trichloride.

It is an additional object of the present invention to provide a process for the continuous reduction of aluminum trichloride to produce pure metallic aluminum.

It is another object of the present invention to provide a process for the production of aluminum from the reaction of aluminum trichloride and manganese where the manganese and resulting manganese chloride are recycled within a single furnace-reactor.

BRIEF DESCRIPTION OF THE DRAWING

The sole FIGURE of the drawing is a schematic illustration of the apparatus for performing the process of the present invention.

DESCRIPTION OF THE PREFERRED EMBODIMENTS

The continuous production of a high-percentage aluminum alloy from the reaction of aluminum trichloride and manganese is made possible in accordance with the present invention by providing a furnace-reactor in the form of a cylindrical ceramic column having temperature control means which permit the maintenance, through temperature control, of distinct reaction zones within the single furnace-reactor column. These zones are, at the outset, briefly described below and comprise:

a chlorination zone at the top of the column where ores of aluminum are reacted with manganese chloride in the presence of carbon monoxide (the reaction product of carbon and oxygen) to yield aluminum trichloride in accordance with the following reaction:

1. $3CO + 1.5O_2 + Al_2O_3 + 3MnCl_2 \rightleftharpoons 2AlCl_3 + 3MnO + 3CO_2$;

a manganese reduction zone located beneath the chlorination zone where manganese oxide produced in the chlorination zone in the presence of carbon is reduced to metallic manganese in accordance with the following gross reaction:

2. $MnO + C \rightleftharpoons Mn + CO$;

an aluminum trichloride reduction zone beneath the manganese reduction zone where the aluminum trichloride produced in the chlorination zone contacts and reacts with the manganese produced in the manganese reduction zone to yield aluminum in accordance with the following gross reaction:

3. $2AlCl_3 + 3Mn \rightarrow 2Al + 3MnCl_2$; and an aluminum rectification zone where remaining amounts of manganese are removed from the aluminum trichloride reduction zone reaction production by reacting aluminum produced in an upper zone (which contains manganese) with the aluminum trichloride produced in the chlorination zone which further reacts with manganese in accordance with the following reactions:

4. $AlCl_3 + 2Al \rightleftharpoons 3AlCl$
5. $AlCl + Mn \rightarrow Al + MnCl$.

The manganese monochloride and aluminum monochloride rise as gases from the aluminum rectification zone and react while passing upward within the tower to yield aluminum in accordance with the following reaction:

6. $AlCl + MnCl \rightarrow Al + MnCl_2$.

The process of the present invention can be easily understood by reference to FIG. 1 which is a schematic diagram illustrating the apparatus for performing the process of the present invention. The process utilizes a conventional cylindrical ceramic furnace tower which comprises furnace-reactor 10 having helical electric coils 12 for control of the temperature ranges necessary to maintain the desired zones within the tower.

Normally, the furnace-reactor is between 20–100 feet high and 5–25 feet in diameter. It is to be understood, however, that the size of the furnace in no way controls the efficiency of the process. Naturally, large furnaces are capable of producing aluminum in greater amounts than smaller furnaces. This is especially true since all of the reactions mentioned in this specification and claims are stoichiometric. Thus, the utilization of large amounts of reactants through the means of large furnaces results in increased production of the desired reaction product. To facilitate the description of the present invention, the ensuing discussion will be directed to a furnace-reactor 40 feet high and 5 feet in diameter.

Also, the process is operative at standard pressure. The only controlling condition for the disclosed process is the various temperature ranges found within the specification and unless specified otherwise all temperatures and all reactions are given at standard pressure.

However, operation at elevated pressure up to approximately 250 p.s.i.g. may prove advantageous, particularly if a very high purity aluminum product is desired. Operation at high pressure suppresses reaction 4, which results in loss of aluminum, and favors reaction 6, which results in formation of aluminum, thus the net effect of operation at high pressure is to yield a higher purity aluminum product.

In operation, the various reaction zones described above are established and maintained by controlling the temperature of the column by coils 12 within the temperature ranges described below. However, the existence and maintenance of these zones is also influenced and controlled by the constituents which are present within the tower. The reaction zones then are determined by both temperature ranges and by appropriate packing of the furnace-reactor. To maintain these zones furnace-reactor 10 is initially loaded as follows:

The aluminum rectification zone 14 and the aluminum trichloride reduction zone 16, which comprise approximately one-half of the volume of the loaded portion of tower 10, are loaded with a mixture by weight of 25 percent pure aluminum, 25 percent pure manganese and 50 percent packing material. The packing material is provided in order to increase the interfacial areas where the reactants can contact each other and combine. In one embodiment the packing is a fused alumina. It is to be understood, however, that any packing material is suitable so long as the material is inert to the systems and capable of withstanding the high temperatures which are normally present during reaction conditions. During the initial phases of operation of the furnace-reactor, the aluminum and manganese constituents of these reaction zones are introduced into the furnace-reactor through an inlet 15 as a 50-50 percent by weight liquid mixture of pure aluminum and manganese. Once loaded no further additions of aluminum are necessary. Inlet 15, however, may be conveniently utilized to introduce pure liquid manganese into the system to replace manganese losses which may result during normal operation of the process. Initially then, the aluminum rectification zone and aluminum trichloride reduction zone contain the same starting materials and differ only by the different temperature ranges to which the respective zones are heated when the tower is in operation.

The manganese oxide reduction zone 18 is located directly above the aluminum trichloride reduction zone 16 and is initially formed by loading through a hopper at 21 approximately one-fourth of the remaining volume of the tower which is to be loaded with a mixture of 50 percent by weight of cake and manganese oxide dust.

Although manganese oxide dust and carbon are provided initially within the manganese oxide reduction zone, once started no further filling of this zone with manganese oxide or carbon is required since the manganese oxide produced in the first zone precipitates to the manganese oxide reduction zone. The carbon requirements of this zone are satisfied by the supply of coke which is continuously fed into the top of furnace-reactor 10.

The chlorination zone 20 preferably is loaded when operation of the tower begins. This zone is maintained by adding an aluminum oxide (alumina) containing raw material through a hopper at 23 and carbon (coke) through a hopper at 21 continuously at the rate of about 2,000 pounds per hour of alumina and 1,000 pounds per hour coke to produce a homogeneous mixture of these constituents within this zone. In connection with the aluminum oxide-containing raw material, any alumina-containing material may be employed in the process through a low slag or preferably slag-free material is desirable to minimize manganese losses.

Since it is undesirable to have any significant quantity of moisture present in furnace-reactor 10, clay or other alumina-containing material is dried in a kiln (not shown) to an appropriately low moisture content, preferably less than 0.1 percent of water by weight. The residence time and temperature employed in such a kiln will necessarily vary depending upon the nature of the raw material used though ordinarily the material will be dried by being calcined at a temperature of from about 200° to 1,200° C. until the moisture content has reached the desired level. The alumina-containing material is appropriately used in the form of pellets having a diameter of approximately one-half to 6 inches.

The coke or other substantially hydrogen-free carbon-containing material (i.e., coal, charcoal, etc.) can be utilized in approximately the same size pellets.

In order for the desired reaction (equation 1) to take place within chlorination zone 20, oxygen is introduced into the chlorination zone at 22 at the rate of approximately 21 lbs. per minute so as to combine with the coke to produce carbon monoxide.

During the initial period of operation of the furnace-reactor 10, the manganese chloride reactant of equation 1 is introduced into the chlorination zone 20 at 21 along with the coke and alumina for about the first hour of operation. The total amount of manganese chloride introduced initially during this first hour is about 2,000 pounds. At the end of the first hour this component of the reaction zone is continually maintained by the manganese chloride gas which rises from the aluminum trichloride reduction zone 16 (equation 3).

As was explained above, the various zones are controlled both by the constituents present and the temperature ranges to which the zones are heated. The temperature of each zone is maintained throughout the process in the approximate range indicated below:

| Zone | Temperature range (°C.) |
| --- | --- |
| Chlorination (20) | 300–1000 |
| Manganese oxide reduction (18) | 1,000–1500 |
| Aluminum trichloride reduction (16) | 1,300–1,500 |
| Aluminum rectification (14) | 1,200–1,300 |

The process of the present invention is described above in its most general aspects and more details of the process are supplied below.

Once the reactor is loaded, induction coils 12 surrounding the furnace-reactor are regulated to maintain temperatures within the furnace-reactor so as to satisfy the temperature requirements for the various zones. In the chlorination zone 20 oxygen combines with carbon to produce carbon monoxide. The alumina, carbon monoxide, manganese chloride and oxygen react within the chlorination zone in accordance with the reaction as shown in equation 1.

The aluminum trichloride, carbon dioxide and excess carbon monoxide pass overhead as formed as a gaseous mixture and are withdrawn upward from the furnace-reactor through conduit 26 which delivers the gaseous mixture to a condenser 28. In order to maintain the substances within conduit 26 in the gaseous phase the temperature of the conduit is maintained at a temperature above 250° C. If the distance of conduit 26 is short, normally the residual heat of the furnace-reactor will be sufficient to satisfy the temperature requirement.

Simultaneously, manganese oxide in the manganese oxide reduction zone 18 is reduced according to the stoichiometric reaction as set forth in equation 3.

The carbon monoxide of equation 3 passes as a gas to the chlorination zone 20 where it is used as a reactant for equation 1. The manganese formed in the manganese oxide reduction zone 18 flows down the furnace as a liquid to the aluminum trichloride reduction zone 16.

While reduction of manganese oxide is proceeding in the manganese oxide reduction zone 18, aluminum trichloride, carbon monoxide and carbon dioxide enter condenser 28. Water or steam at a temperature sufficiently low to lower the temperature of the gas to 200° C. is circulated through condenser 28 in the direction of arrow 29 condensing aluminum trichloride gas as a liquid and passing carbon monoxide and carbon dioxide out of the system at 30. Liquid aluminum trichloride at a temperature of about 200° C. is withdrawn from the condenser through conduit 32 and pumped by a pump (not shown) into a compressor 32. After being compressed to a pressure between about 50–250 p.s.i.g. the aluminum trichloride passes into a preheater 34. In preheater 34 saturated or superheated steam at a temperature of 200–600° C. is circulated in the direction of the arrow. The aluminum trichloride then flow through conduit 38 into a superheater 40. Within the superheater, heat is applied to the aluminum trichloride with travels within coils 42 by a direct flame head 44 which vaporizes the aluminum trichloride to a temperature between 1,100–1,400° C. The aluminum trichloride in the gaseous phase then passes from superheater 40 through conduit 46 into the bottom of furnace-reactor 10 at 48. The aluminum trichloride gas passes up through the column, reacting with the substances present in both the aluminum rectification zone 14 and the aluminum trichloride reduction zone 16.

In the aluminum trichloride reduction zone 16 the aluminum trichloride reacts with manganese in accordance with the reaction of equation 3. Any unreacted aluminum trichloride gas rises through the column and ultimately exits from the furnace-reactor through conduit 26 to be recycled back into the furnace-reactor at 48 as described above. The manganese chloride rises as a gas to the chlorination zone 20 where it liquifies due to the temperature of that zone and reacts with the alumina, coke and oxygen, which are constantly fed into this zone, in accordance with equation 1. Manganese chloride remains in the gaseous state in the lower three zones even at pressures far exceeding the vapor pressure due to the excess aluminum trichloride coming up the furnace and the formation of a complex between manganese chloride and aluminum trichloride.

The aluminum reaction product of equation 3 and unreacted manganese flow downward into the aluminum rectification zone 14. In the aluminum rectification zone, the amount of excess manganese is greatly reduced by the reactions set forth in equations 4 and 5. In this zone aluminum trichloride and aluminum react to form aluminum monochloride which is unstable. The aluminum monochloride reacts with the manganese present in this zone at the temperature maintained therein to form aluminum and manganese monochloride. The manganese monochloride further combines with aluminum monochloride as set forth in equation 6 to yield aluminum and manganese chloride. Thus, the products produced in the rectification zone are aluminum in the liquid phase which is continuously withdrawn) and manganese chloride and manganese monochloride, both gases, which rise in the tower. Aluminum is continuously withdrawn from the furnace-reactor through conduit 50 as essentially pure manganese-free aluminum.

The following example results in the continuous production of essentially manganese-free aluminum:

Example

The furnace-reactor is a round ceramic tower 40 feet high and 5 feet wide. The lower 20 feet of the tower is packed with a 50–25–25 weight percent mixture of 2-inch-diameter crushed alumina, aluminum and manganese. The aluminum and manganese are introduced as a homogeneous liquid mixture through a conduit located about 25 feet from the top of the tower after the alumina packing is added to the reactor. The next 10 feet of the tower is packed with a mixture of 50 percent by weight of cake and manganese oxide dust.

Aluminum oxide (clay) and coke is continually fed into the remaining volume of the tower at the rate of 2,000 pounds per hour of clay and 1,000 pounds per hour of coke from hoppers at the top of the tower.

The induction coils surrounding the tower are heated so that the lower 10 feet of the tower are at a temperature between 1,200°–1,300° C., the next 10 feet a temperature of 1,300°–1,500° C., the next 10 feet at 1,000°–1,500° C. and the top of the tower at a temperature of 300°–1,000° C.

For the first hour of operation, a total of 2,000 pounds of solid manganese chloride is fed into the tower along with the clay and coke through the hoppers at the top of the tower.

Oxygen is fed continuously into the tower 10 at about 10 feet from the top at a rate of 21 pounds per minute.

The aluminum trichloride, carbon monoxide and carbon dioxide gaseous mixture that is formed is removed from the tower at a rate of 133 pounds per minute at a temperature of approximately 250° C. and a pressure of approximately 30 p.s.i.g. The gaseous mixture is passed into a condenser and cooled to a temperature of about 200° C. The aluminum trichloride content of the gaseous mixture is condensed to a liquid and the carbon monoxide and carbon dioxide components are passed through the top of the condenser at a rate of about 83 pounds per minute. These gases leave the condenser at a temperature of about 250° C. and a pressure of about 30 p.s.i.g. The aluminum trichloride liquid is withdrawn from the condenser by a pump at the rate of about 87 pounds per minute and is passed through a compressor where the pressure is increased from 30 p.s.i.g. to 100 p.s.i.g. After being compressed liquid aluminum trichloride is then passed through a direct flame and superheated to a temperature of 1,200° C. The superheated gaseous aluminum trichloride is then introduced into the furnace-reactor from the bottom at a pressure of 80 p.s.i.g. and a temperature of 1,200° C. The flow rate of aluminum trichloride introduced into the bottom of the furnace-reactor is 187 pounds per minute or 177 cubic feet per minute.

To replace any manganese losses which may occur, liquid manganese is injected into the tower through the inlet provided about 25 feet from the top of the tower for initially loading manganese and aluminum. The flow of liquid manganese into the tower is controlled so that approximately 10 tons of manganese is constantly present in the tower. High purity liquid aluminum is continuously drained through a gooseneck and an air trap at the bottom of the tower at the rate of 1,060 pounds per hour.

By providing a single reactor furnace for the reduction of aluminum trichloride as described above, the continuous production of high-purity aluminum is possible.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A process for the production of aluminum in a reactor comprising the steps of:
   a. chlorinating an alumina-containing material in a chlorination zone of said reactor to yield aluminum trichloride,
   b. reducing manganese oxide to manganese in a manganese oxide reduction zone of said reactor,
   c. delivering manganese from said manganese oxide reduction zone to an aluminum trichloride reduction zone of said reactor,
   d. delivering the aluminum trichloride produced in the chlorination zone into said aluminum trichloride reduction zone,
   e. reacting said manganese and aluminum trichloride in said aluminum trichloride reduction zone to yield aluminum and manganese chloride, and
   f. extracting aluminum from the reactor.

2. A process for the production of aluminum in a reactor comprising the steps of:
   a. chlorinating an alumina-containing material by reacting said material with manganese chloride in an upper chlorination zone of said reactor to yield aluminum trichloride,
   b. delivering manganese oxide produced in said chlorination zone into a manganese oxide reduction zone,
   c. reducing manganese oxide to manganese in said manganese oxide reduction zone,
   d. delivering manganese from said manganese oxide reduction zone to an aluminum trichloride reduction zone,
   e. delivering aluminum trichloride produced in the chlorination zone into said aluminum trichloride reduction zone,
   f. reacting said manganese and aluminum trichloride in said aluminum trichloride reduction zone to yield aluminum and manganese chloride, and
   g. extracting aluminum from a lower zone in said reactor.

3. The process defined in claim 2 wherein the manganese chloride produced in the aluminum trichloride reduction zone is recycled back to said chlorination zone.

4. The process defined in claim 3 wherein said zones are oriented within a reactor as follows: a lower aluminum trichloride reduction zone, the manganese oxide reduction zone located above said aluminum trichloride reduction zone and a chlorination zone located above said manganese oxide reduction zone.

5. The process defined in claim 4 additionally comprising an aluminum rectification zone located beneath said aluminum trichloride reduction zone and including the step of delivering aluminum trichloride into said aluminum rectification zone to react with manganese present in said rectification zone.

6. The process defined in claim 5 wherein said zones are maintained at temperatures within the following approximate ranges:

| Zone | Temperature Range °C. |
|---|---|
| Chlorination | 300–1,000 |
| Manganese oxide reduction | 1,000–1,500 |
| Aluminum trichloride reduction | 1,300–1,500 |
| Aluminum rectification | 1,200–1,300 |

7. The process defined in claim 6 including the step of continuously withdrawing aluminum from said aluminum rectification zone.

PO-1050
(5/69)

UNITED STATES PATENT OFFICE
CERTIFICATE OF CORRECTION

Patent No. 3,615,360            Dated October 26, 1971

Inventor(s) Harry Gordon Harris, Jr. and Raymond V. Bailey and Charles Toth

It is certified that error appears in the above-identified patent and that said Letters Patent are hereby corrected as shown below:

Column 1, line 4, "629,036" should be --692,036;
          line 75, "al." should be --of--.
Column 2, line 47, "production" should be --product--.
Column 3, line 57, "cake" should be --coke--.
Column 5, line 16, "flow" should be --flows--;
          line 18, "with" should be --which--;
          line 57, "(" should appear before "which";
          line 75, "cake" should be --coke--.

Signed and sealed this 11th day of April 1972.

(SEAL)
Attest:

EDWARD M. FLETCHER, JR.
Attesting Officer

ROBERT GOTTSCHALK
Commissioner of Patents